(12) United States Patent
Matsumoto et al.

(10) Patent No.: US 10,067,401 B2
(45) Date of Patent: Sep. 4, 2018

(54) BEAM EXPANDER

(71) Applicant: Hamamatsu Photonics K.K., Hamamatsu-shi, Shizuoka (JP)

(72) Inventors: Naoya Matsumoto, Hamamatsu (JP); Takashi Inoue, Hamamatsu (JP); Yuu Takiguchi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 14/395,167

(22) PCT Filed: Apr. 18, 2013

(86) PCT No.: PCT/JP2013/061516
§ 371 (c)(1),
(2) Date: Oct. 17, 2014

(87) PCT Pub. No.: WO2013/157606
PCT Pub. Date: Oct. 24, 2013

(65) Prior Publication Data
US 2015/0131142 A1    May 14, 2015

(30) Foreign Application Priority Data
Apr. 20, 2012    (JP) ................. 2012-096815

(51) Int. Cl.
*G02F 1/29* (2006.01)
*G02B 26/06* (2006.01)
(Continued)

(52) U.S. Cl.
CPC .............. *G02F 1/29* (2013.01); *G02B 26/06* (2013.01); *G02B 26/0825* (2013.01);
(Continued)

(58) Field of Classification Search
CPC ..... G02F 1/29; G02B 26/0875; G02B 26/0825
(Continued)

(56) References Cited

U.S. PATENT DOCUMENTS

2006/0250581 A1* 11/2006 Silverstein ........... H04N 9/3105
353/20
2010/0318073 A1    12/2010 Vogler et al.

FOREIGN PATENT DOCUMENTS

JP    S61-087116      5/1986
JP    06222300 A   *   8/1994
(Continued)

OTHER PUBLICATIONS

"Saishin Kogaku Gijutsu Handbook/Latest Optical Technology Handbook", Asakura Publishing Co., Ltd., Part IV, section 1.3.2 c, with attached partial English Language Translation.
(Continued)

*Primary Examiner* — Thomas K Pham
*Assistant Examiner* — Mitchell Oestreich
(74) *Attorney, Agent, or Firm* — Drinker Biddle & Reath LLP

(57) ABSTRACT

A beam expander includes a first lens unit including one of an SLM or a VFL, a second lens unit being optically coupled to the first lens unit and including one of an SLM or a VFL, and a control unit controlling focal lengths of the first and second lens units. A distance between the first and second lens units is invariable. The control unit controls the focal lengths of the first and second lens units such that a light diameter $D_1$ of light input to the first lens unit and a light diameter $D_2$ of light output from the second lens unit are different from each other.

6 Claims, 11 Drawing Sheets

(51) Int. Cl.
  *G02B 27/09* (2006.01)
  *G02B 26/08* (2006.01)
  *G02B 21/16* (2006.01)
  *G02B 27/56* (2006.01)

(52) U.S. Cl.
  CPC ..... *G02B 26/0875* (2013.01); *G02B 27/0927* (2013.01); *G02B 27/0938* (2013.01); *G02B 21/16* (2013.01); *G02B 27/56* (2013.01); *G02F 2001/294* (2013.01)

(58) Field of Classification Search
  USPC ........................................................ 359/316
  See application file for complete search history.

(56) References Cited

FOREIGN PATENT DOCUMENTS

| JP | H6-222300 | 8/1994 | | |
|---|---|---|---|---|
| JP | 2001-042275 | 2/2001 | | |
| JP | 2006-147057 | 6/2006 | | |
| JP | 2008-535012 | 8/2008 | | |
| JP | 2008-542795 | 11/2008 | | |
| JP | 2011-112764 | 6/2011 | | |
| JP | 2011112764 A | * | 6/2011 | |
| JP | WO 2011/074319 | 6/2011 | | |
| JP | 102010002722 | 9/2011 | | |
| JP | WO 2012/017788 | 2/2012 | | |
| JP | 2012-189792 | 10/2012 | | |
| WO | WO 2005/006053 | 1/2005 | | |
| WO | WO 2006/035775 | 4/2006 | | |
| WO | WO 2008/102894 | 8/2008 | | |
| WO | WO 2011/046035 | 4/2011 | | |
| WO | WO 2011074319 A1 | * | 6/2011 | ......... G02B 26/0825 |

OTHER PUBLICATIONS

L. A. Romero et al., "Lossless laser beam shaping", JOSA, vol. 13, No. 4, 1996, pp. 751-760.

English-language translation of International Preliminary Report on Patentability (IPRP) dated Oct. 30, 2014 that issued in WO Patent Application No. PCT/JP2013/061516.

Koshichi Nemoto et al., "Simulation of Beam-forming of Wave Using Deformable Reflectors", T. IEE Japan, vol. 115-A, No. 8, 1995, p. 683-p. 690, with attached partial English-language translation.

* cited by examiner

Fig.3
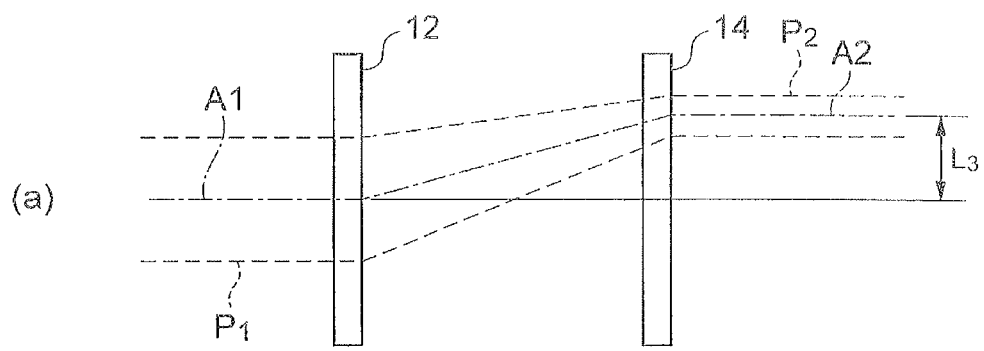
(a)
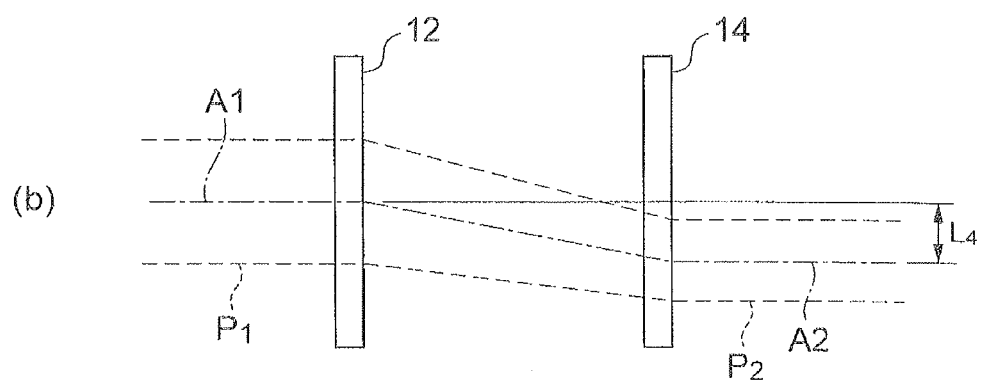
(b)

Fig.4
(a) 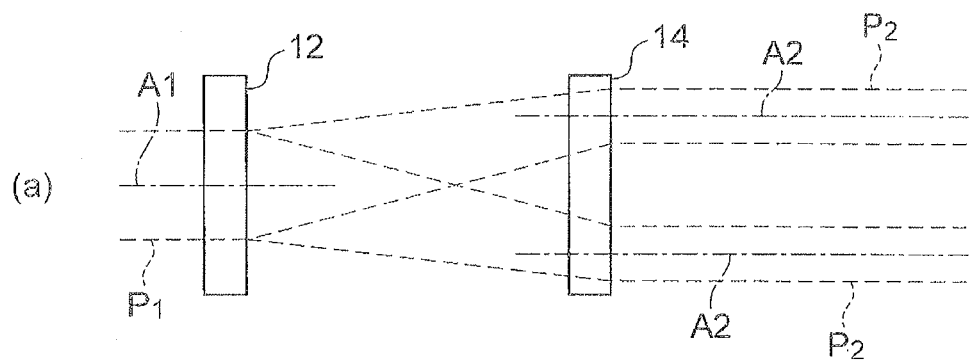
(b) 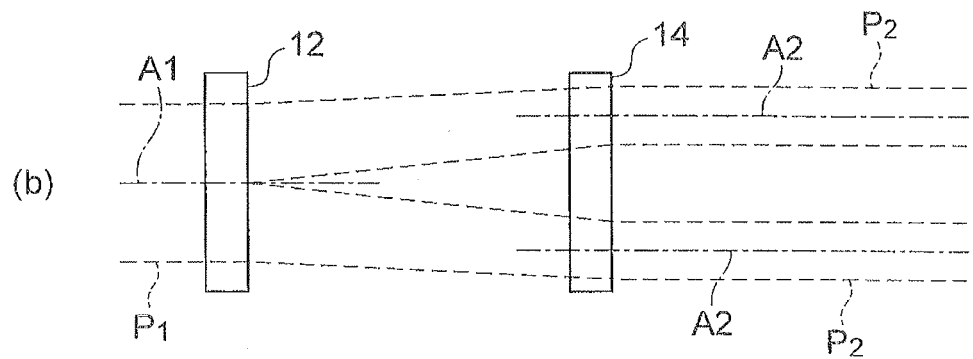

Fig.8
(a) 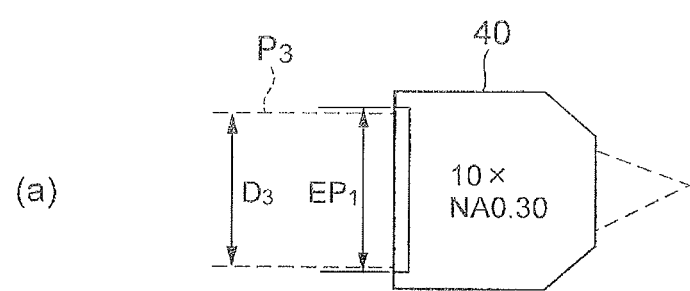
(b) 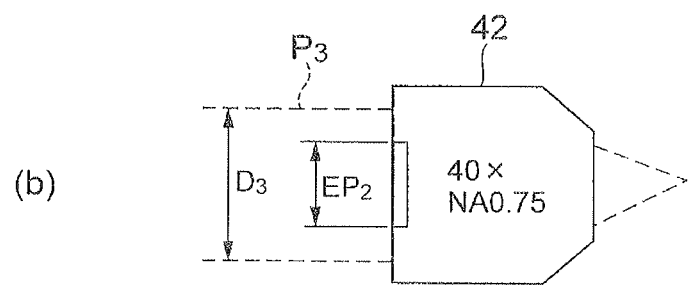

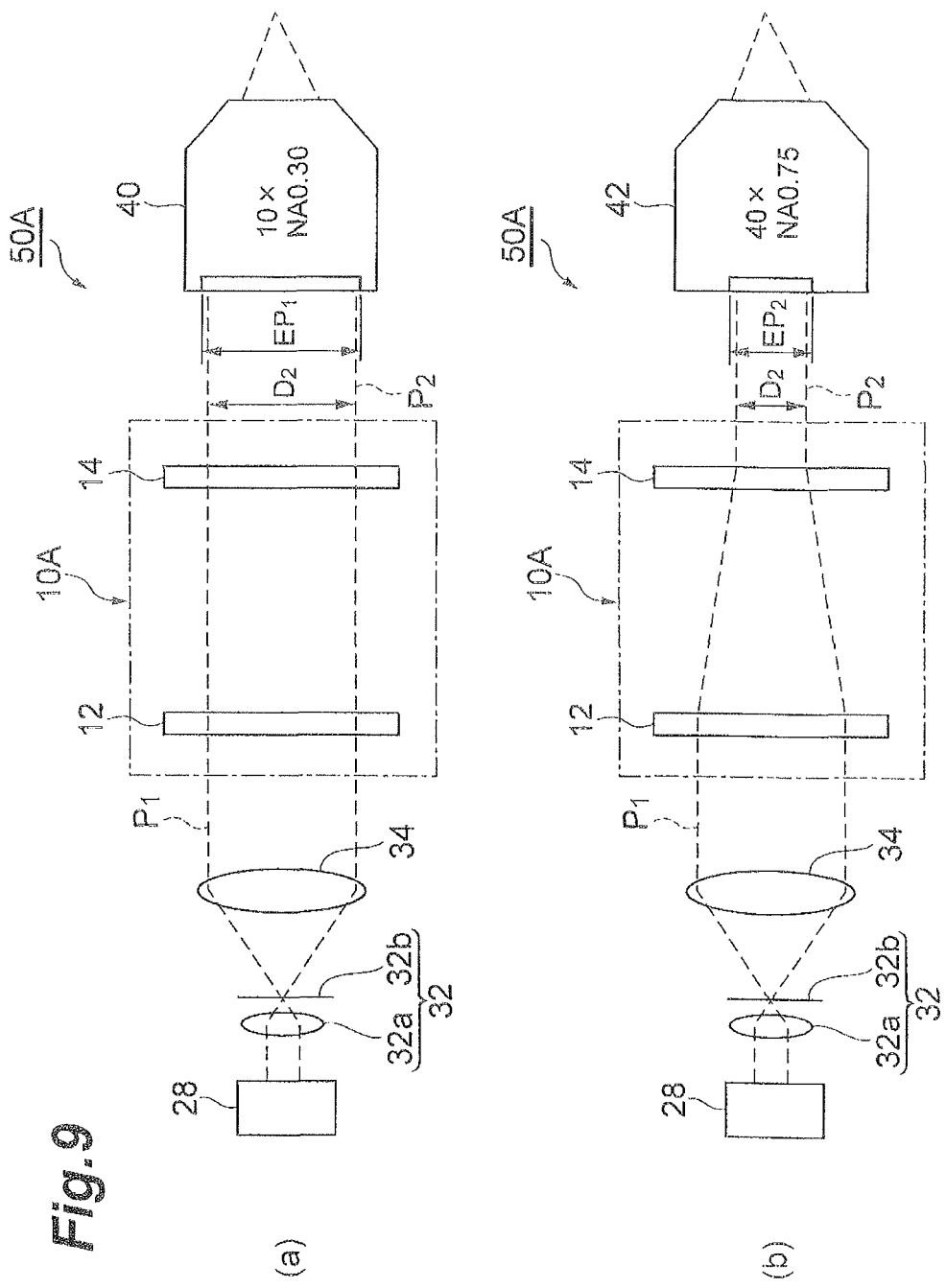

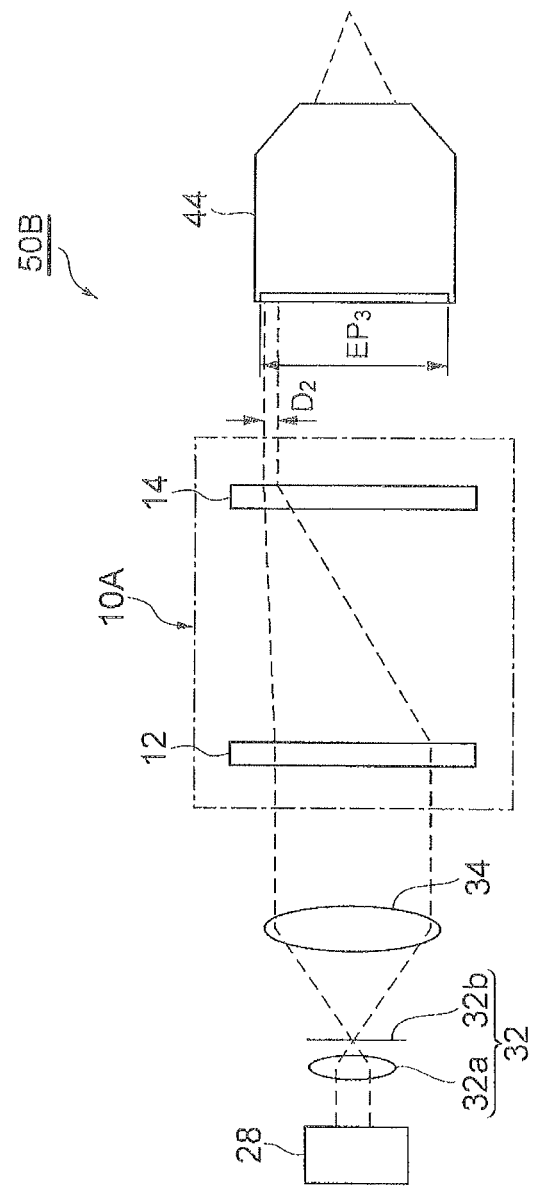

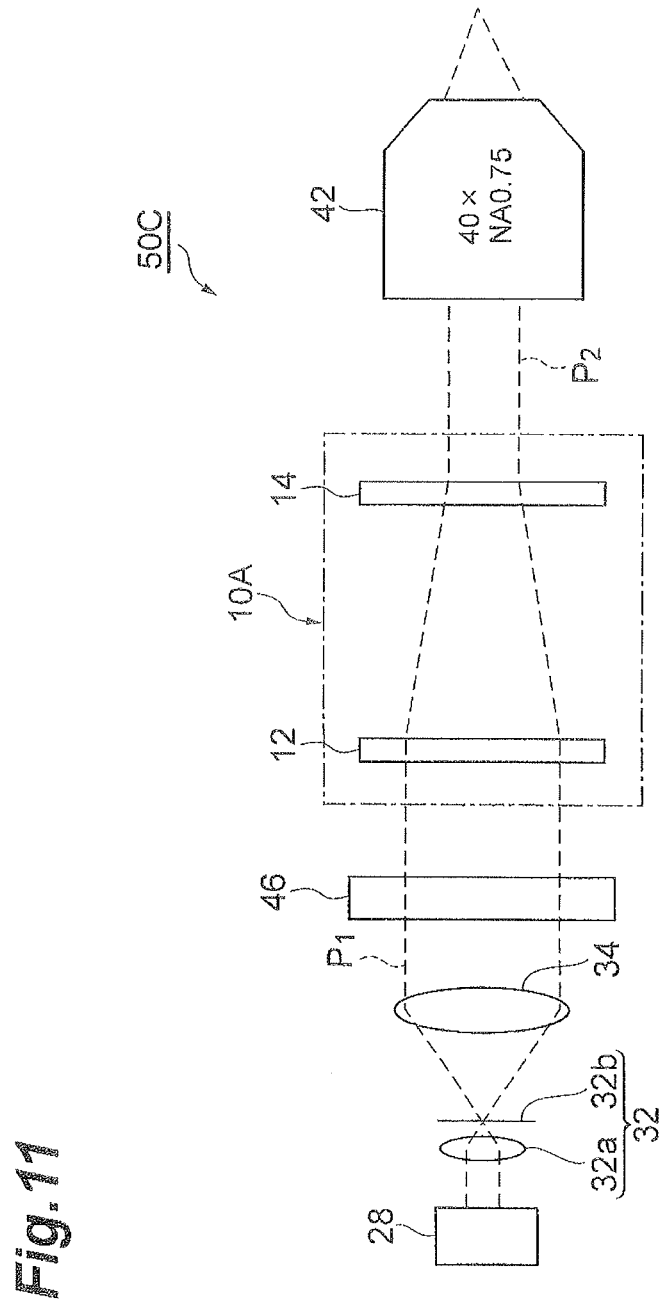

BEAM EXPANDER

TECHNICAL FIELD

The present invention relates to a beam expander.

BACKGROUND ART

A beam expander means an optical component which is capable of changing a light diameter of parallel light to be adapted to an optical component at a subsequent stage. Generally, in order to configure a beam expander, it is necessary to relatively move at least two groups of lenses on an optical axis. That is, these groups are relatively moved in an optical system composed of the two groups of lenses, so as to change a combined focal length. Thereby, it is possible to make a light diameter of parallel light output from the other group different with respect to a light diameter of parallel light incident into one of the groups (for example, refer to Non-Patent Document 1).

CITATION LIST

Non Patent Literature

Non-Patent Document 1: Asakura Publishing Co., Ltd. "*Saishin Kogaku Gijutsu Handbook* (Latest Optical Technology Handbook)" Part IV, section 1.3.2 c Non-Patent Document 2: L. A. Romero et al., "Lossless laser beam shaping," JOSA, vol. 13, No. 4, pp. 751-760 (1996)

SUMMARY OF INVENTION

Technical Problem

As described above, in the conventional beam expander composed of a plurality of lens groups, it is necessary to mechanically move the lens groups in an optical axis direction in order to change a light diameter of parallel light. However, in order to improve a positional accuracy at the time of mechanically moving the lenses, an extremely complex mechanism is required. Further, because it takes a given time for moving the lens groups, it is difficult to shorten a required time at the time of changing a light diameter.

The present invention has been achieved in view of the above problem, and an object thereof is to provide a beam expander which is able to be easily configured, and is capable of shortening a required time at the time of changing a light diameter.

Solution to Problem

In order to solve the above-described problem, a beam expander according to the present invention includes a first lens unit including one of a spatial light modulator or a vari-focal lens, a second lens unit being optically coupled to the first lens unit, and including one of a spatial light modulator or a vari-focal lens, and a control unit controlling focal lengths of the first lens unit and the second lens unit, and in the beam expander, a distance between the first lens unit and the second lens unit is invariable, and the control unit controls the focal lengths of the first lens unit and the second lens unit such that a light diameter of light input to the first lens unit and a light diameter of light output from the second lens unit are different from each other. Specifically, for example, the control unit controls the focal lengths of the first lens unit and the second lens unit by providing a lens pattern to a spatial light modulator, or by controlling a focal length of a vari-focal lens.

In this beam expander, in place of the two or more lens groups in the conventional beam expander, the first lens unit and the second lens unit which are composed of one of the spatial light modulators or van-focal lenses are disposed. The spatial light modulator and the van-focal lens are optical components which are capable of changing a focal length without changing a position in an optical axis direction. Therefore, a focal length of the entire beam expander system is arbitrarily changed in a state in which a distance between the first lens unit and the second lens unit is fixed, thereby it is possible to change a light diameter of parallel light output from the second lens unit with respect to a light diameter of parallel light input to the first lens unit. Further, these optical components are capable of changing a focal length in an extremely short time according to an electrical signal from the control unit. Accordingly, in accordance with the above-described beam expander, it is possible to shorten a required time at the time of changing a light diameter. Further, because a complex mechanism for moving lens groups is not required, it is possible to easily configure the entire beam expander system.

Advantageous Effects of Invention

In accordance with the beam expander according to the present invention, it is possible to easily configure the beam expander, and shorten a required time at the time of changing a light diameter.

BRIEF DESCRIPTION OF DRAWINGS

FIG. 3 includes diagrams showing other examples of a control method for a first lens unit and a second lens unit by a control unit.

FIG. 4 includes diagrams showing other examples of the control method for the first lens unit and the second lens unit by the control unit.

FIG. 8 includes diagrams showing a low numerical aperture/low magnification objective lens and a high numerical aperture/high magnification objective lens.

FIG. 9 includes diagrams showing a configuration of a microscope according to a third embodiment.

FIG. 10 is a diagram showing a TIRF microscope according to a fourth embodiment.

FIG. 11 is a diagram showing a configuration example of a processing microscope according to a fifth embodiment.

DESCRIPTION OF EMBODIMENTS

Hereinafter, embodiments of a beam expander according to the present invention will be described in detail with reference to the accompanying drawings. In addition, in the description of the drawings, the same components are denoted by the same reference symbols, and overlapping descriptions will be omitted.

First Embodiment

Figure 1:
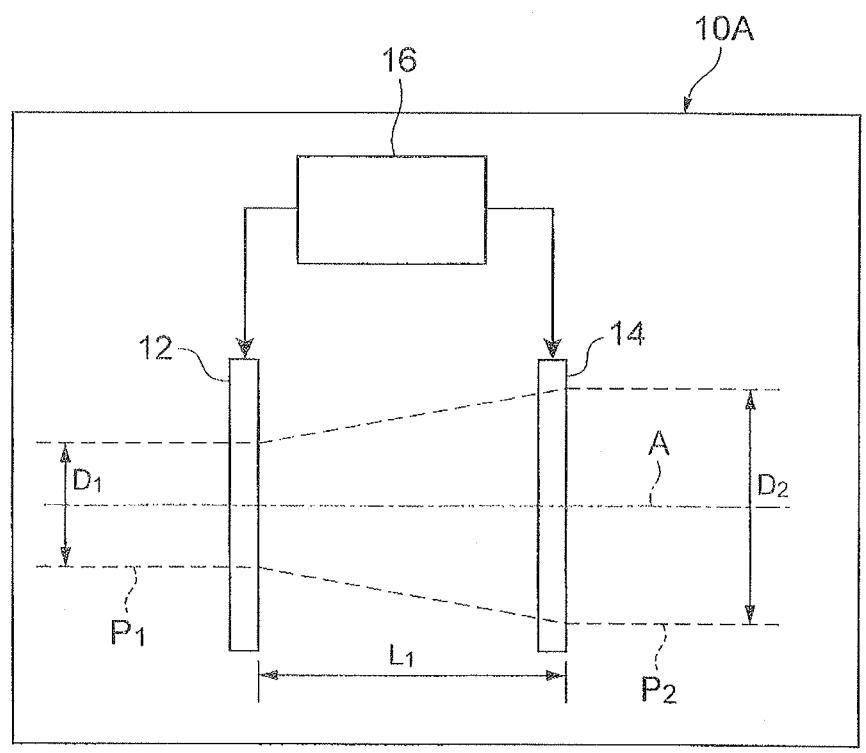
FIG. 1 is a diagram showing a configuration of a beam expander according to a first embodiment.

FIG. 1 is a diagram showing a configuration of a beam expander 10A according to a first embodiment of the present invention. The beam expander 10A according to the present embodiment includes a first lens unit 12, a second lens unit 14, and a control unit 16. The first lens unit 12 and the second lens unit 14 are disposed in line in a direction along an optical axis A of parallel light to be input to the beam expander 10A, and the second lens unit 14 is optically coupled to the first lens unit 12. In addition, as shown in another embodiment which will be described later, an optical component such as a lens or a reflecting mirror may be interposed between the first lens unit 12 and the second lens unit 14.

In this beam expander 10A, input light $P_1$ which is parallel light is incident from the front face (a surface on the opposite side to a surface facing the second lens unit 14) of the first lens unit 12. Then, this input light $P_1$ is expanded in diameter (or reduced in diameter) by the first lens unit 12 and the second lens unit 14, and output light $P_2$ which is parallel light is output from a back face (a surface on the opposite side to a surface facing the first lens unit 12) of the second lens unit 14. A size of a light diameter $D_2$ of the output light $P_2$ is different from a size of a light diameter $D_1$ of the input light $P_1$. In addition, a light diameter means a maximum diameter of the input light $P_1$ or the output light $P_2$ in a cross section orthogonal to the optical axis. Further, the cross section, orthogonal to the optical axes, of the input light $P_1$ and the output light $P_2$ is typically circular.

The first lens unit 12 includes one of a spatial light modulator (SLM: Spatial Light Modulator) or a van-focal lens (VFL: Vari-Focal Lens). Further, in the same way, the second lens unit 14 as well includes one of a spatial light modulator or a van-focal lens. That is, there are the following four patterns as a combination of the first lens unit 12 and the second lens unit 14.

TABLE 1

| | First lens unit | Second lens unit |
| --- | --- | --- |
| Pattern 1 | Spatial light modulator | Spatial light modulator |
| Pattern 2 | Spatial light modulator | Vari-focal lens |
| Pattern 3 | Vari-focal lens | Spatial light modulator |
| Pattern 4 | Vari-focal lens | Vari-focal lens |

As a spatial light modulator which is usable as the first lens unit 12 or the second lens unit 14, there is a phase-modulation type spatial light modulator, for example, a refractive-index changing material type SLM (for example, as an SLM using a liquid crystal, an LCOS (Liquid Crystal on Silicon) type, an LCD (Liquid Crystal Display), or the like), a segment mirror type SLM, a continuous deformable mirror type SLM, or the like. A refractive-index changing material type SLM, a segment mirror type SLM, and a continuous deformable mirror type SLM function as a lens which is provided with a variety of lens patterns by applying a voltage, an electric current, or writing light, thereby having an arbitrary focal length.

In addition, a transmission type spatial light modulator is exemplified in the present embodiment, meanwhile, the spatial light modulator may be a reflection type spatial light modulator. Further, as a vari-focal lens as the first lens unit 12 or the second lens unit 14, a lens which is capable of arbitrarily changing a refractive index of an optical path such as a liquid crystal or an electro-optic crystal, or capable of changing its shape may be preferably used. In these vari-focal lenses, a focal length is arbitrarily controlled by applying a voltage or an electric current.

Further, different from the conventional beam expander, in the beam expander 10A according to the present embodiment, a distance $L_1$ between the first lens unit 12 and the second lens unit 14 is invariable, and the positions of the first lens unit 12 and the second lens unit 14 are relatively fixed with respect to an optical component (not shown) provided at the subsequent stage.

The control unit 16 controls a focal length $f_1$ of the first lens unit 12 and a focal length $f_2$ of the second lens unit 14. In the case where the first lens unit 12 and/or the second lens unit 14 are spatial light modulators, the control unit 16 provides an electrical signal (a lens pattern) for driving the respective pixels of the spatial light modulator to the first lens unit 12 and/or the second lens unit 14. Further, in the case where the first lens unit 12 and/or the second lens unit 14 are vari-focal lenses, the control unit 16 provides an electrical signal for controlling a focal length of the vari-focal lens to the first lens unit 12 and/or the second lens unit 14. In the beam expander 10A, the control unit 16 changes the focal lengths $f_1$ and $f_2$ of the first lens unit 12 and the second lens unit 14 in this way, thereby the light diameter $D_2$ of the output light $P_2$ is arbitrarily changed with respect to the light diameter $D_1$ of the input light $P_1$. In addition, the control unit 16 may be disposed in a housing in which the first lens unit 12 and the second lens unit 14 are housed, or may be disposed outside the housing.

For example, in order to output the output light $P_2$ as parallel light when the input light $P_1$ which is parallel light is incident, it is preferable that the control unit 16 provide an electrical signal (a lens pattern in the case of the spatial light modulator) that the focal lengths $f_1$ and $f_2$ of the first lens unit 12 and the second lens unit 14 satisfy the relationship shown in the following formula (1), to the first lens unit 12 and the second lens unit 14.

[Formula 1]

$$f_2 = L_1 - f_1 \quad (1)$$

At this time, a ratio between the light diameter $D_1$ of the input light $P_1$ and the light diameter $D_2$ of the output light $P_2$ (magnification ratio $M = D_2/D_1$) is expressed by the following formula (2).

[Formula 2]

$$M = \frac{|L_1 - f_1|}{f_1} \quad (2)$$

As is clear from the above formulas (1) and (2), in the case where the focal length $f_1$ of the first lens unit 12 is greater than the distance $L_1$ between the first lens unit 12 and the second lens unit 14, the focal length $f_2$ of the second lens unit 14 becomes negative, and light reaching the second lens unit 14 from the first lens unit 12 becomes converging light. Further, in the case where the focal length $f_1$ is greater than 0, and smaller than the distance $L_1$, the focal length $f_2$ becomes positive, meanwhile, in this case, light reaching the second lens unit 14 from the first lens unit 12 is once condensed between the first lens unit 12 and the second lens unit 14, to be thereafter diverging light, that reaches the second lens unit 14. Then, this light is collimated by a lens whose refractive power displayed on the second lens unit 14 is positive. Further, in the case where the focal length $f_1$ is less than 0 as well, the focal length $f_2$ becomes positive, meanwhile, in this case, light reaching the second lens unit 14 from the first lens unit 12 becomes diverging light. Then, this light is collimated by a lens whose refractive power displayed on the second lens unit 14 is positive.

Figure 2:
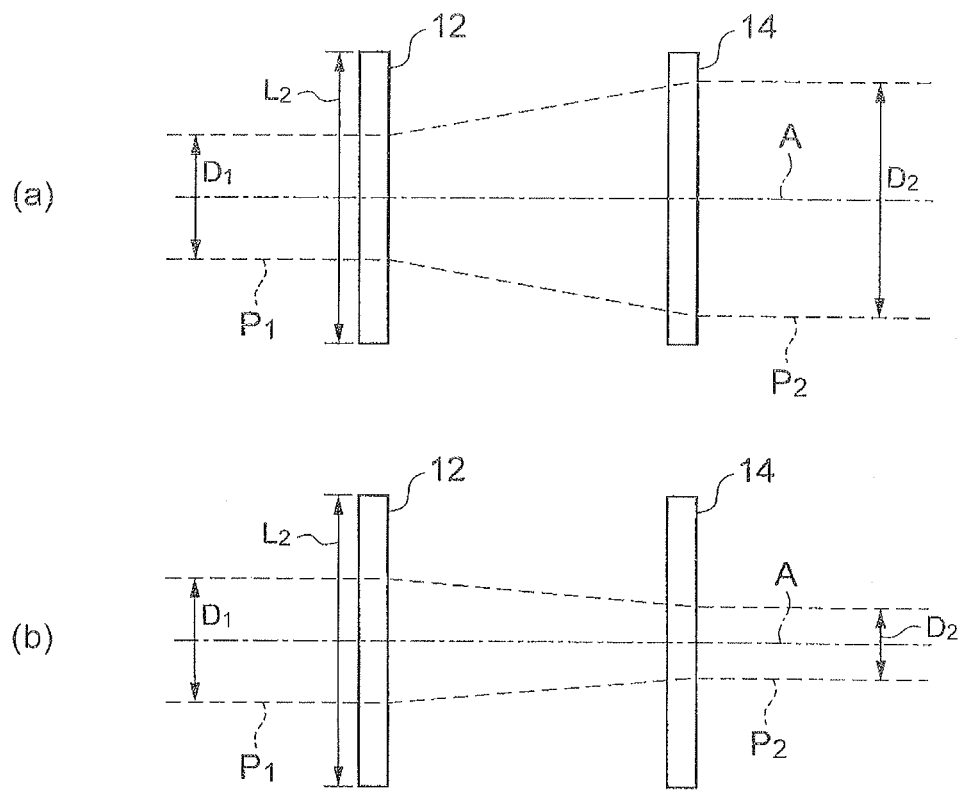
FIG. 2 includes diagrams showing situations in which parallel light is expanded or reduced in diameter by the beam expander.

FIG. 2 includes diagrams showing situations in which parallel light is expanded or reduced in diameter by the beam expander 10A. (a) in FIG. 2 shows a situation in which the parallel light is expanded in diameter ($f_1<0$, $f_2>0$, $f_2=L_1-f_1$), and (b) in FIG. 2 shows a situation in which parallel light is reduced in diameter ($f_1>0$, $f_2<0$, $f_2=L_1-f_1$). Here, the light diameter $D_1$ of the input light $P_1$ incident into the first lens unit 12 is preferably ½ or less of a length $L_2$ of an effective surface of the first lens unit 12. This is because, due to the light diameter $D_1$ being ½ or less of a length $L_2$, it is possible to restrain lowering in diffraction efficiency (light-condensing efficiency) in the first lens unit 12, and make the distance $L_1$ between the first lens unit 12 and the second lens unit 14 shorter.

For example, it is assumed that the input light $P_1$ with a light diameter of 10 mm is input to the first lens unit 12 composed of an LCOS type spatial light modulator. At this time, for example, if a lens pattern in which the focal length $f_1$ is 800 mm or more is displayed on the spatial light modulator, its light-condensing efficiency is about 90%. Then, the light-condensing efficiency is lowered as the focal length $f_1$ becomes shorter than 800 mm, and in the case where the focal length $f_1$ is 300 mm, its light-condensing efficiency is plus 50%. Such lowering in light-condensing efficiency is caused due to a spatial frequency of the lens pattern becoming higher, and a diffraction efficiency being lowered in a region near the outer edge of the spatial light modulator. That is, when the light diameter $D_1$ of the input light $P_1$ is small, it is possible to realize a high light-condensing efficiency even in the case where the focal lengths $f_1$ and $f_2$ are short. For example, the light diameter $D_1$ is made ½ or less of the length $L_2$, thereby it is possible to display a lens pattern in which the focal length $f_2$ is shorter than 800 mm, on the second lens unit 14. Then, when an attempt is made to realize the same light diameter $D_2$, it is possible to shorten the distance $L_1$ by that length when the focal length $f_2$ is shorter. By shortening the distance $L_1$, it is possible to further downsize the beam expander 10A.

Further, due to the light diameter $D_1$ being ½ of or less than the length $L_2$, it is also possible to obtain the effect described next. That is, it is possible to effectively reduce a light diameter by displaying a convex lens on the first lens unit 12, and in contrast, it is possible to effectively expand a light diameter by displaying a concave lens. As an example, a case (refer to (a) in FIG. 2) where the input light $P_1$ with a light diameter $D_1=5$ mm is input to the first lens unit 12, and the output light $P_2$ with a light diameter $D_2=10$ mm is output from the second lens unit 14, and a case (refer to (b) in FIG. 2) where the output light $P_2$ with a light diameter $D_2=0.5$ mm is output from the second lens unit 14 will be considered. In the case where the light diameter $D_2$ is 10 mm, the magnification ratio of the light diameter is twice. In the case where the focal length $f_2$ of the second lens unit 14 is up to 800 mm, it is possible to set the distance $L_1$ to 400 mm, and the focal length $f_1$ in that case is −400 mm. Further, in the case where the light diameter $D_2$ is 0.5 mm, the magnification ratio of the light diameter is 0.1 times. In the case where the distance $L_1$ is set to 400 mm, the focal length $f_1$ is set to 440 mm and the focal length $f_2$ is set to −40 mm, thereby it is possible to realize this small light diameter $D_2$.

FIG. 3 includes diagrams showing other examples of a control method for the first lens unit 12 and the second lens unit 14 by the control unit 16. FIG. 3 shows the examples in which the positions and the light diameters of the input light $P_1$ input to the first lens unit 12 and the output light $P_2$ output from the second lens unit 14 are respectively different from each other. That is, in (a) in FIG. 3, the straight line including a central axis line A1 of the input light $P_1$ and the straight line including a central axis line A2 of the output light $P_2$ are separated from each other by a distance $L_3$, and in (b) in FIG. 3, the straight line including the central axis line A1 of the input light $P_1$ and the straight line including the central axis line A2 of the output light $P_2$ are separated from each other by a distance $L_4$. Such configurations are possible in the case where at least one of the first lens unit 12 and the second lens unit 14 is composed of a spatial light modulator, and are preferably realized by, for example, providing a superimposed pattern that a phase pattern such as a diffraction grating pattern or a hologram pattern is superimposed onto a lens pattern, to the spatial light modulator.

To describe in detail, in the case where at least one of the first lens unit 12 and the second lens unit 14 is composed of a spatial light modulator, the control unit 16 is capable of presenting a superimposed pattern that a variety of diffraction grating patterns are superimposed on a lens pattern to be provided to both or one of the first lens unit 12 and the second lens unit 14, in the spatial light modulator. In accordance with this, as shown in (a) in FIG. 3 and (b) in FIG. 3 for example, so-called beam steering in which the output light $P_2$ is moved onto an arbitrary optical axis A2 different from the optical axis A1, is made possible. In such a configuration, it is possible to parallelize the optical axis A2 of the output light $P_2$ output from the second lens unit 14 to the optical axis A1 of the input light $P_1$ while inclining an optical axis of light going between the first lens unit 12 and the second lens unit 14.

Further, due to the control unit 16 presenting a superimposed pattern that a predetermined diffraction grating pattern is superimposed onto a lens pattern, in the spatial light modulator, as shown in (a) in FIG. 4, it is possible to perform steering of a plurality of beams, that is, the output light $P_2$ is moved onto a plurality of optical axes (for example, A2 in the drawing) different from the optical axis A1 while forming a plurality of (two in the drawing) optical axes inclined in directions different from each other with respect to the optical axis A1 between the first lens unit 12 and the second lens unit 14. It is possible to realize such a configuration by, for example, providing a lens pattern, to the spatial light modulator, for splitting light output from the second lens unit 14 into a plurality of optical paths for light input to the first lens unit 12.

Further, due to the control unit 16 presenting a superimposed pattern that a predetermined diffraction grating pattern is superimposed onto a lens pattern, in the spatial light modulator, as shown in (b) in FIG. 4, the first lens unit 12 may be split into a plurality of (two in the drawing) regions, and optical axes inclined (or parallel) with respect to the optical axis A1 may be formed between each of these regions and the second lens unit 14. In accordance with the configuration shown in (b) in FIG. 4, as compared with the configuration of (a) in FIG. 4, it is possible to make a diffraction angle in the first lens unit 12 smaller, which makes it possible to reduce the burden of the first lens unit 12. Here, the burden of the first lens unit 12 will be described. In the case where the first lens unit 12 is composed of a spatial light modulator (SLM), a lens pattern to be displayed on this SLM is a phase pattern which is called a Fresnel lens pattern. This pattern is derived by the following formula (3).

[Formula 3]

$$\phi(r) = \mod\left(-\frac{\pi r^2}{\lambda f}, 2\pi\right) \quad (3)$$

In the formula (3), r is a distance from the central point of a lens pattern, λ is a wavelength of a beam to be incident, and f is a focal length of a lens. Further, this formula (3) expresses the case where a method of wrapping a phase at 2π (rad) (called phase-wrapping) is used in order to display a Fresnel lens pattern in an SLM which can express phase difference up to 2π (rad). As is clear from this formula (3), a phase becomes steeper as it moves away from the central point of the lens pattern. Therefore, phase-wrapping is frequently caused in the peripheral portion of the lens pattern. Then, when an interval of phase-wrapping becomes shorter than twice the pixel pitch of the SLM, it is no longer possible to express a Fresnel lens pattern. In order to avoid such a phenomenon, in a case where the NA becomes too large, it is preferable to effectively use the light by splitting light into a plurality of regions while limiting the NA by use of the configuration shown in (b) in FIG. 4.

As shown in FIG. 3 and FIG. 4, in accordance with the beam expander 10A of the present embodiment, it is possible to perform, in addition to changing of a light diameter, controls such as changing of an optical axis position of the output light $P_2$ and splitting of the output light $P_2$, which have been unable to be performed by a conventional optical lens.

Further, in the case where at least one of the first lens unit 12 and the second lens unit 14 is composed of a spatial light modulator, the control unit 16 is capable of superimposing a variety of hologram patterns on a lens pattern to be provided to both or one of the first lens unit 12 and the second lens unit 14. In accordance therewith, it is possible to realize the configurations as shown in FIG. 3 and FIG. 4.

Further, in the case where at least one of the first lens unit 12 and the second lens unit 14 is composed of a spatial light modulator, the control unit 16 is capable of superimposing a pattern for correcting aberrations generated by a distortion included in an optical system or a vari-focal lens onto a lens pattern to be provided to both or one of the first lens unit 12 and the second lens unit 14.

A lens which is disposed separately from the first lens unit 12 and the second lens unit 14, and a vari-focal lens which is used as the first lens unit 12 and the second lens unit 14 may have slight distortions. It is desired to correct aberrations by such distortions in order to accurately perform phase modulation. Accordingly, it is preferable that a pattern for correcting aberrations be superimposed on a lens pattern to be provided to the first lens unit 12 and/or the second lens unit 14. Thereby, it is possible to highly accurately configure an optical system. Further, in accordance with the beam expander 10A of the present embodiment, in this way, it is also possible to easily configure the entire system without need for a complex lens shaping at the time of correcting aberrations.

In the beam expander 10A of the present embodiment described above, in place of the two or more lens groups in the conventional beam expander, the first lens unit 12 and the second lens unit 14 which are composed of one of the spatial light modulators or vari-focal lenses are disposed. As described above, a spatial light modulator and a vari-focal lens are optical components which are capable of changing the focal lengths $f_1$ and $f_2$ without changing a position in a direction of the optical axis A. Therefore, in a state in which the distance $L_1$ between the first lens unit 12 and the second lens unit 14 is fixed, it is possible to arbitrarily change a magnification of the light diameter $D_2$ of the output light $P_2$ with respect to the light diameter $D_1$ of the input light $P_1$. Further, these optical components are capable of changing the focal lengths $f_1$ and $f_2$ in an extremely short time according to an electrical signal from the control unit 16. Accordingly, in accordance with the beam expander 10A of the present embodiment, as compared with the conventional beam expander, it is possible to considerably shorten a required time at the time of changing a magnification of the light diameter $D_2$. Further, because a complex mechanism for moving lens groups is not required, it is possible to easily configure the entire beam expander system.

In addition, in the case where at least one of the first lens unit 12 and the second lens unit 14 is composed of a spatial light modulator, a value of a focal length which can be realized by the spatial light modulator has a lower limit. Accordingly, a limit is to be put in a variable range of light diameter by the beam expander 10A as well. In order to solve such a problem, it is preferable that a fixed focus lens be appropriately inserted between the first lens unit 12 and the second lens unit 14. Or, the first lens unit 12 and/or the second lens unit 14 may be composed of a plurality of spatial light modulators, or a plurality of lens patterns may be displayed on the first lens unit 12 and/or the second lens unit 14, thereby performing phase modulation a plurality of times. For example, by adopting these methods, it is possible to expand a variable range of light diameter.

Further, in the present embodiment, the first lens unit 12 and the second lens unit 14 may compose a 4f optical system. As the 4f optical system, for example, a both-side telecentric optical system composed of a plurality of lenses is preferable.

Second Embodiment

Figure 5:
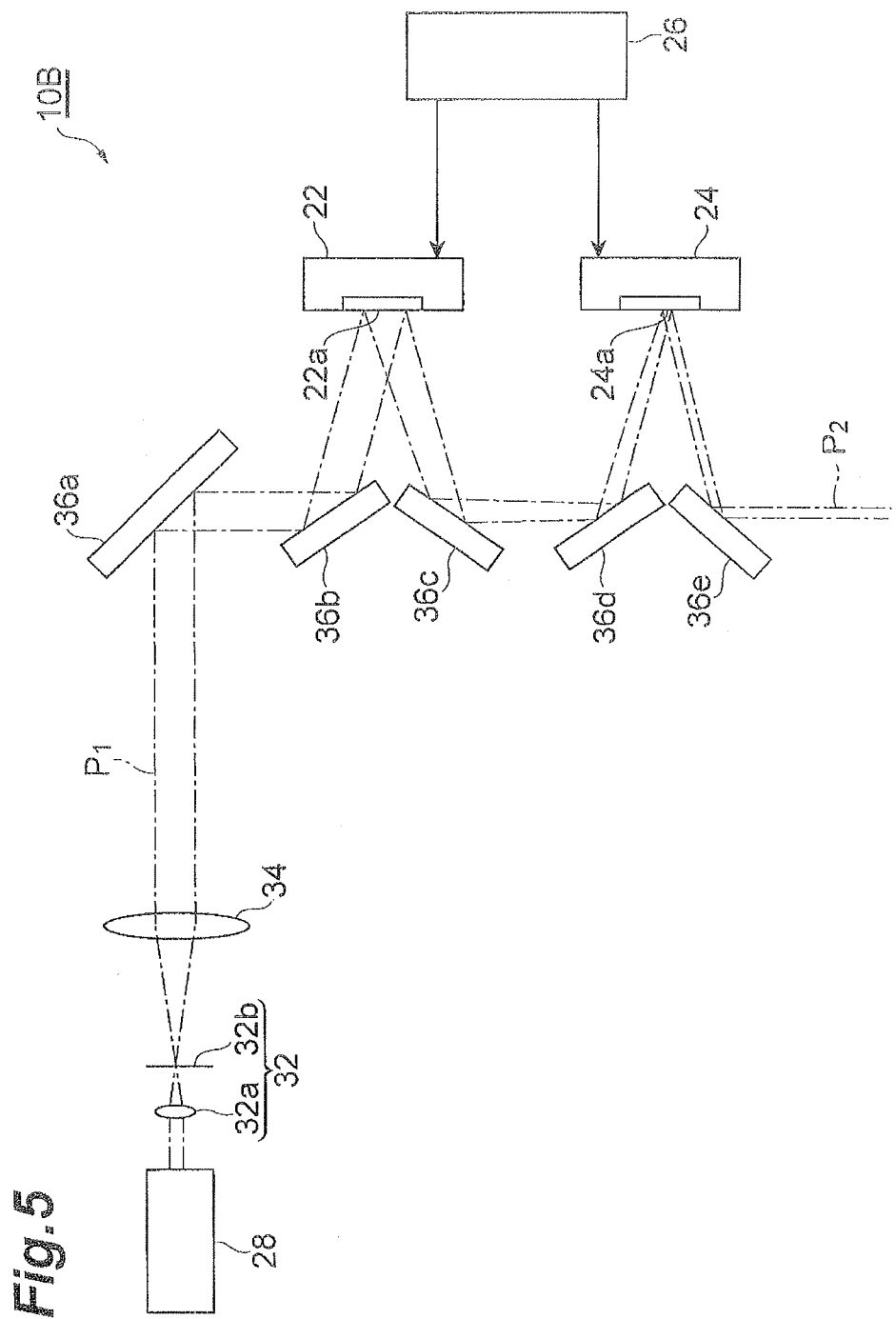
FIG. 5 is a diagram showing a configuration of the beam expander according to a second embodiment.

FIG. 5 is a diagram showing a configuration of a beam expander 10B according to a second embodiment of the present invention. The beam expander 10B according to the present embodiment includes a first lens unit 22, a second lens unit 24, and a control unit 26. The first lens unit 22 and the second lens unit 24 are composed of reflection type spatial light modulators, and respectively have light-reflecting surfaces 22a and 24a. Further, as shown in FIG. 5, the beam expander 10B may further include a laser light source 28, a spatial filter 32, a collimating lens 34, and reflecting mirrors 36a to 36e serving as reflective elements.

In the present embodiment, the second lens unit 24 is optically coupled to the first lens unit 22 according to a structure which will be described below. That is, the light-reflecting surface 24a of the second lens unit 24 is optically coupled to the light-reflecting surface 22a of the first lens unit 22 via the reflecting mirrors 36d and 36c serving as a plurality of reflective elements, and is simultaneously optically coupled to the reflecting mirror 36e. Further, the input light $P_1$ is input to the light-reflecting surface 22a of the first lens unit 22 via the reflecting mirrors 36b and 36a. The input light $P_1$ is appropriately generated, for example, such that laser light emitted from the laser light source 28 passes through a condensing lens 32a and a pinhole 32b of the spatial filter 32 so as to eliminate wavefront noise and distortion, and thereafter passes through the collimating lens 34, to be parallelized.

In the beam expander 10B according to the present embodiment as well, an optical distance between the first lens unit 22 and the second lens unit 24 (that is, a distance from the first lens unit 22 up to the second lens unit 24 via the reflecting mirrors 36c and 36d) is invariable, and the positions of the first lens unit 22 and the second lens unit 24 are relatively fixed with respect to an optical component coupled at the subsequent stage of the reflecting mirror 36e. In addition, the optical distance between the first lens unit 22 and the second lens unit 24 corresponds to the distance $L_1$ in the first embodiment.

The control unit 26 controls the focal lengths $f_1$ and $f_2$ of the first lens unit 22 and the second lens unit 24. The control unit 26 provides an electrical signal (a lens pattern) for driving the respective pixels of the spatial light modulators to the first lens unit 22 and the second lens unit 24, thereby displaying the lenses with the focal lengths $f_1$ and $f_2$, respectively, on these spatial light modulators. In the beam expander 10B, the control unit 26 changes the focal lengths $f_1$ and $f_2$ of the first lens unit 22 and the second lens unit 24 in this way, thereby outputting the output light $P_2$ which is parallel light different in light diameter from the input light $P_1$. In addition, the control unit 26 may be disposed in a housing in which the first lens unit 22 and the second lens unit 24 are housed, or may be disposed outside the housing.

As in the present embodiment, the first lens unit and the second lens unit may be composed of reflection type spatial light modulators. Even in such a case, it is possible to exert the same effects as those in the aforementioned first embodiment.

(Modification)

Figure 6:
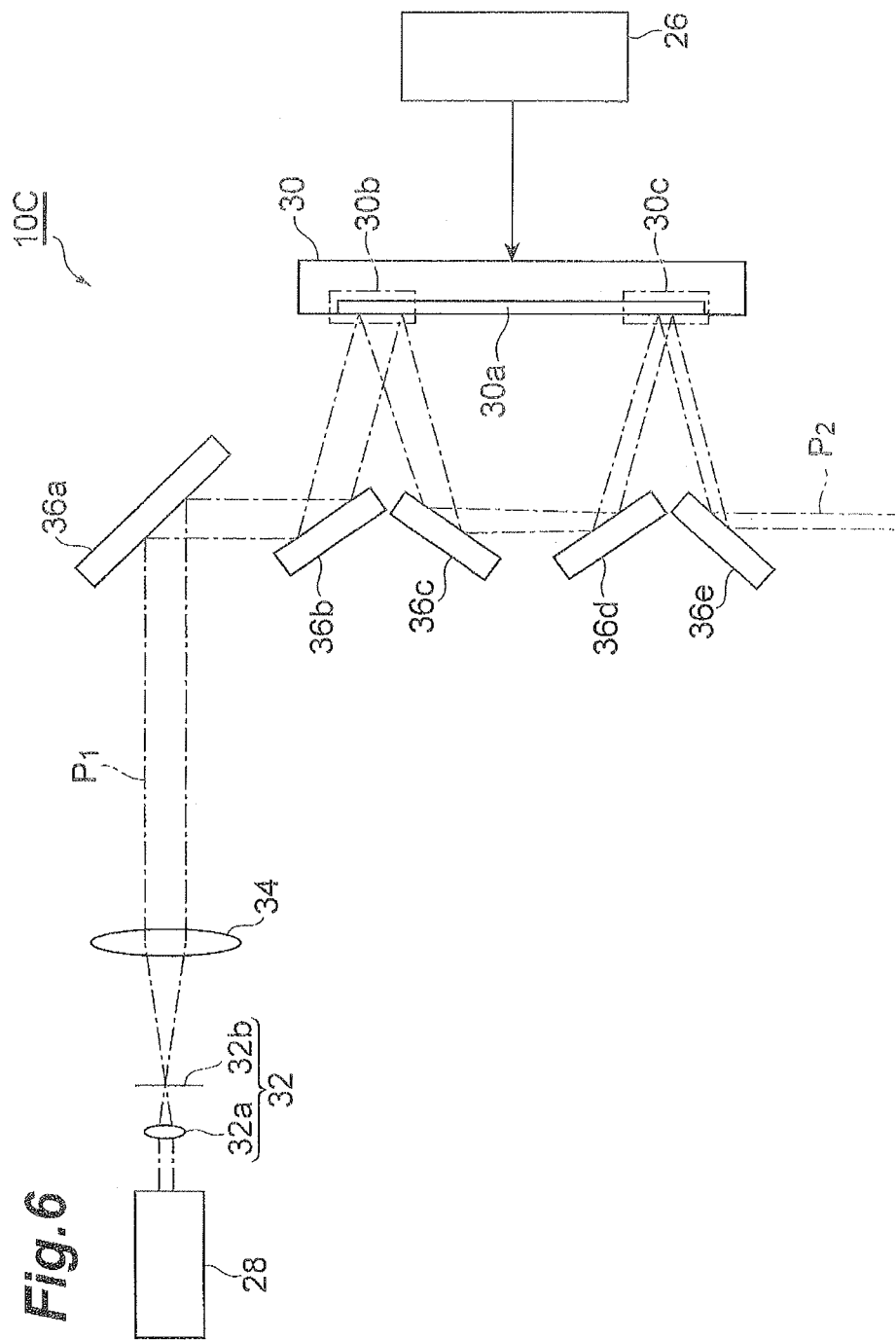
FIG. 6 is a diagram showing a configuration of the beam expander as a modification of the second embodiment.

FIG. 6 is a diagram showing a configuration of a beam expander 10C as a modification of the second embodiment. A point of difference between the beam expander 10C according to the present modification and the second embodiment is the configurations of the first lens unit and the second lens unit. That is, in the present modification, the beam expander 10C includes a single reflection type spatial light modulator 30, and the first lens unit and the second lens unit are composed of the single reflection type spatial light modulator 30, and a partial region (a first region) of its light-reflecting surface 30a is used as a first lens unit 30b, and another partial region (a second region) is used as a second lens unit 30c. In the present modification, the second lens unit 30c is optically coupled to the first lens unit 30b via the reflecting mirrors 36d and 36c, and is simultaneously optically coupled to the reflecting mirror 36e. Further, the input light $P_1$ which is parallel light is incident into the first lens unit 30b via the reflecting mirrors 36b and 36a.

In the beam expander 10C according to the present modification as well, an optical distance between the first lens unit 30b and the second lens unit 30c is invariable, and the positions of the first lens unit 30b and the second lens unit 30c are relatively fixed with respect to an optical component coupled at the subsequent stage of the reflecting mirror 36e. In addition, the optical distance between the first lens unit 30b and the second lens unit 30c corresponds to the distance $L_1$ in the first embodiment.

The control unit 26 controls the focal lengths of the first lens unit 30b and the second lens unit 30c. The control unit 26 provides an electrical signal (a lens pattern) for driving the respective pixels of the spatial light modulator 30 to the spatial light modulator 30, thereby displaying the lenses with the focal lengths $f_1$ and $f_2$, respectively, on the first lens unit 30b and the second lens unit 30c. In the beam expander 10C, the control unit 26 changes the focal lengths of the first lens unit 30b and the second lens unit 30c in this way, thereby outputting the output light $P_2$ which is parallel light different in light diameter from the input light $P_1$.

As in the present modification, the first lens unit and the second lens unit may be composed of a common single spatial light modulator. Even in such a case, it is possible to exert the same effects as those in the aforementioned first embodiment.

Figure 7:
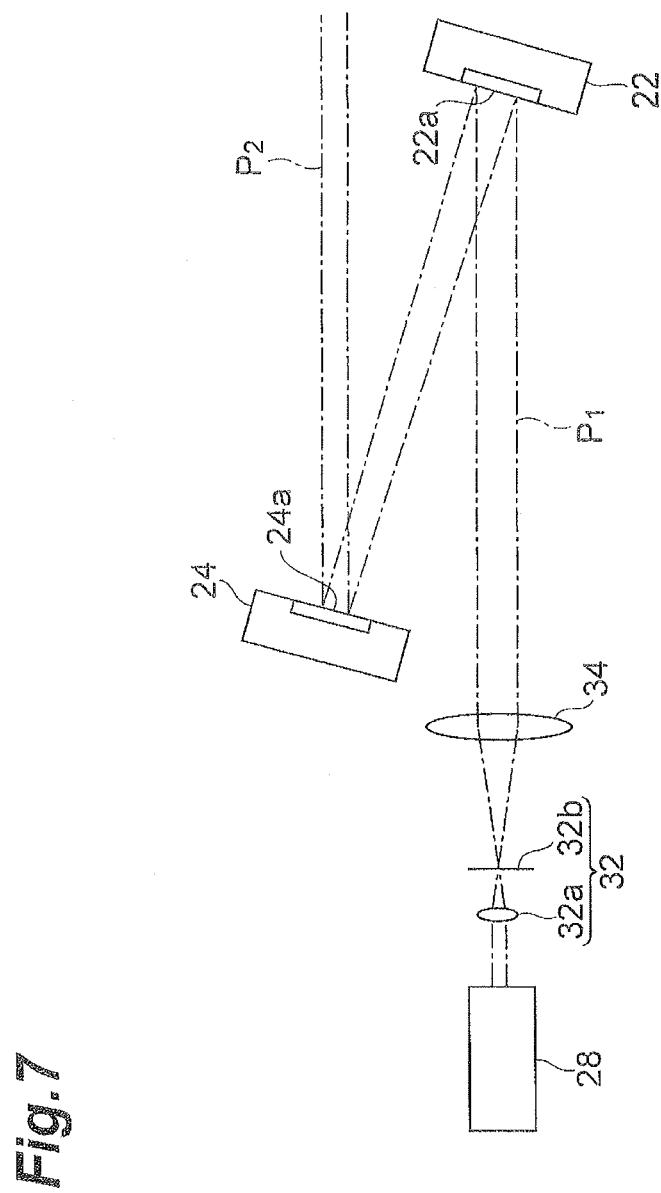
FIG. 7 is a diagram showing a configuration of the beam expander as another modification of the second embodiment.

Further, in the second embodiment and the modification, as an optical system in which light is incident into and emitted from the first lens unit and the second lens unit, a variety of configurations other than the configurations shown in FIG. 5 and FIG. 6 are possible. For example, an expander may be provided in place of the spatial filter 32 and the collimating lens 34, and the reflecting mirrors 36a to 36e may be replaced with other light reflective optical components such as a triangular prism. Further, as shown in FIG. 7, a configuration without use of reflecting mirrors is possible. Further, in the configuration of FIG. 7, the reflection type spatial light modulator composing the first lens unit 22 and the reflection type spatial light modulator composing the second lens unit 24 are preferably disposed such that their light-reflecting surfaces 22a and 24a are parallel to one another. In this case, it is possible to make the input light $P_1$ and the output light $P_2$ substantially parallel, and make the device relatively compact.

Third Embodiment

Next, as a third embodiment of the present invention, a microscope including the beam expander 10A according to the first embodiment described above will be described. Here, a laser scanning microscope will be described as an example.

The laser scanning microscope performs raster scanning of a light condensing point of laser light which is concentrated by an objective lens or the like on a surface of an object, and performs imaging by use of fluorescence, reflected light, or scattered light generated by the scanning, or emission of light generated from the object by the irradiated laser light. The larger the numerical aperture (NA) of the objective lens is, the smaller the size of the light condensing point of the laser light is, and the smaller the light condensing point is, the higher the resolution of imaging is. However, the smaller the light condensing point is, the greater the number of scanning for imaging is, which leads to a long time required for imaging. Then, first, it may be conceived that imaging at low resolution is performed for a wide region of an object in a short time by use of an objective lens with a smaller numerical aperture, a partial region in the region is selected on the basis of a result of the imaging, and imaging at high resolution is performed for the region by use of an objective lens with a larger numerical aperture.

In this case, it is necessary to switch between the objective lens with a smaller numerical aperture and the objective lens with a larger numerical aperture, which causes a problem described next in such a case. Generally, many low-magnification objective lenses have smaller numerical apertures, and many high-magnification objective lenses have larger numerical apertures. FIG. 8 shows, as an example, a low-magnification objective lens 40 with a numerical aperture of 0.3 and with a magnification of 10 times ((a) in FIG. 8), and a high-magnification objective lens 42 with a numerical aperture of 0.75 and with a magnification of 40 times ((b) in FIG. 8). In order to condense light with the objective lenses 40 and 42 so as to obtain a diffraction-limited image, a light diameter $D_3$ of light $P_3$ to be incident into the objective lenses 40 and 42 is preferably matched to exit pupil diameters $EP_1$ and $EP_2$.

The exit pupil diameters $EP_1$ and $EP_2$ of the objective lenses 40 and 42 are determined according to the magnifications and the numerical apertures of the objective lenses 40 and 42. For example, in the objective lens 40 with a magnification of 10 times and a numerical aperture of 0.3 which is shown in (a) in FIG. 8, the exit pupil diameter $EP_1$ is 10.80 mm. Further, for example, in the objective lens 42 with a magnification of 40 times and a numerical aperture of 0.75 which is shown in (b) in FIG. 8, the exit pupil diameter $EP_2$ is 6.75 mm. In this way, an exit pupil diameter of a low-magnification objective lens is greater than an exit pupil diameter of a high-magnification objective lens. Accordingly, in the case where no mechanism for changing a light diameter is provided, the light diameter $D_3$ of the light $P_3$ is matched to the exit pupil diameter $EP_1$ of the low-magnification objective lens 40. However, because this light diameter $D_3$ is too large for the exit pupil diameter $EP_2$ of the high-magnification objective lens 42, it is impossible for the peripheral part of the light $P_3$ to pass through the exit pupil. Accordingly, only a part of the light $P_3$ is to be condensed, which causes a loss in the amount of light. For example, in the case where the light $P_3$ has a top-hat shaped intensity distribution, an amount of light condensed by the objective lens 42 with a magnification of 40 times is about 40% of an amount of light of the incident light $P_3$, which causes a large loss in the amount of light.

In this way, in the case where objective lenses having a variety of magnifications and numerical apertures are switched to perform observation, because the exit pupil diameters of these objective lenses are different from each other, the problem that a loss in the amount of light is caused in a high-magnification objective lens occurs. Accordingly, in the present embodiment, a light diameter of light incident into the objective lens is adjusted according to an exit pupil diameter of the objective lens by use of the beam expander 10A according to the first embodiment.

FIG. 9 includes diagrams showing a configuration of a microscope 50A according to the present embodiment. As shown in FIG. 9, the microscope 50A includes the beam expander 10A, the laser light source 28, the spatial filter 32, the collimating lens 34, and the objective lenses 40 and 42. In addition, the beam expander 10B (or 10C) according to the second embodiment may be applied in place of the beam expander 10A.

The input light $P_1$ is input to the first lens unit 12. The input light $P_1$ is appropriately generated, for example, such that laser light emitted from the laser light source 28 passes through the condensing lens 32a and the pinhole 32b of the spatial filter 32 so as to eliminate wavefront noise and distortion, and thereafter passes through the collimating lens 34, to be parallelized. Then, this input light $P_1$ is expanded in diameter (or reduced in diameter) by the first lens unit 12 and the second lens unit 14, and output light $P_2$ which is parallel light is output from a back face (a surface on the opposite side to a surface facing the first lens unit 12) of the second lens unit 14. The output light $P_2$ is incident into the exit pupil of the objective lens 40 or 42, and is condensed at the objective lens 40 or 42.

A size of the light diameter $D_2$ of the output light $P_2$ is adjusted by the first lens unit 12 and the second lens unit 14 so as to correspond to the exit pupil diameters $EP_1$ and $EP_2$ of the objective lenses 40 and 42. That is, as shown in (a) in FIG. 9, when the objective lens 40 with low magnification/low numerical aperture is selected, the focal length $f_1$ of the first lens unit 12 and the focal length $f_2$ of the second lens unit 14 are controlled so as to approximate the light diameter $D_2$ of the output light $P_2$ to the relatively large exit pupil diameter $EP_1$. In addition, the light diameter $D_1$ of the input light $P_1$ may be matched to the exit pupil diameter $EP_1$ of the objective lens 40 in advance, and the magnification of the light diameter $D_2$ with respect to the light diameter $D_1$ may be 1. Further, as shown in (b) in FIG. 9, when the objective lens 42 with high magnification/high numerical aperture is selected, the focal length $f_1$ of the first lens unit 12 and the focal length $f_2$ of the second lens unit 14 are controlled so as to approximate the light diameter $D_2$ of the output light $P_2$ to the relatively small exit pupil diameter $EP_2$.

As in the present embodiment, it is possible to reduce a loss in the amount of light by adjusting a light diameter of light incident into the objective lens according to an exit pupil diameter by use of the beam expander 10A (or 10B, 10C).

Here, specific numerical values are shown with respect to the above-described effects. Currently, there are spatial light modulators having light use efficiencies of 90% or more. In the case where such spatial light modulators are used as the first lens unit 12 and the second lens unit 14, an amount of light of the output light $P_2$ is approximately 80% of an amount of light of the input light $P_1$. Accordingly, a loss in the amount of light in the objective lens 42 is about 20%, and it is possible to obtain an amount of condensed light which is twice the amount of condensed light in the conventional art.

Fourth Embodiment

Next, as a fourth embodiment of the present invention, another microscope including the beam expander 10A according to the first embodiment described above will be described. Here, a TIRF (Total Internal Reflection Fluorescence) microscope will be described as an example. A TIRF microscope is a device which performs imaging such that laser light is totally reflected on an observation object, to generate an evanescent field and excite fluorescence, and includes an ultrahigh-magnification objective lens having an extremely large numerical aperture.

FIG. 10 is a diagram showing this TIRF microscope 50B. The TIRF microscope 50B includes the beam expander 10A, the laser light source 28, the spatial filter 32, the collimating lens 34, and the objective lens 44. In addition, the beam expander 10B (or 10C) according to the second embodiment may be applied in place of the beam expander 10A.

The objective lens 44 has an extremely high numerical aperture of, for example, 1.65, and ultrahigh magnification of, for example, 100 times. In this TIRF microscope, in order to utilize total reflection of laser light, it is necessary to bring light to be incident into the vicinity of the edge portion of the exit pupil of the objective lens 44. Accordingly, in the present embodiment, as shown in FIG. 10, the position of the central axis line of the output light $P_2$ is moved to the vicinity of the edge portion of the exit pupil of the objective lens 44 by the beam expander 10A. At the same time, the light diameter $D_2$ of the output light $P_2$ is made sufficiently small as compared with the exit pupil diameter $EP_3$ of the objective lens 44.

In this way, the beam expander 10A (or 10B, 10C) is applied to the TIRF microscope 50B, thereby it is possible to arbitrarily control a position and a light diameter of light to be incident into the objective lens 44, to preferably obtain a TIRF image. Further, in the case where this microscope also includes a normal objective lens, it is possible to easily change a light diameter and an optical axis position of light so as to correspond to these objective lenses. Then, it is possible to easily configure such a microscope, and shorten a required time at the time of changing a light diameter.

Fifth Embodiment

Next, as a fifth embodiment of the present invention, yet another microscope including the beam expander 10A according to the first embodiment described above will be described. Here, a processing microscope will be described as an example. A processing microscope is a device which performs processing by irradiating an object with laser light to melt the object.

FIG. 11 is a diagram showing a configuration example of such a processing microscope. The processing microscope 50C shown in FIG. 11 includes the beam expander 10A, the laser light source 28, the spatial filter 32, the collimating lens 34, and the objective lens 42. In addition, the beam expander 10B (or 10C) according to the second embodiment may be applied in place of the beam expander 10A.

Further, the processing microscope 50C further includes a diffractive optical element (DOE: Diffractive Optical Element) 46. The diffractive optical element 46 is optically coupled between the collimating lens 34 and the first lens unit 12, and applies a predetermined diffractive action to the input light $P_1$ to be provided from the collimating lens 34 to the first lens unit 12. This diffractive optical element 46 and a spatial light modulator are combined, and for example, a phase distribution by an iterative Fourier method or a phase distribution described in Non-Patent Document 2 is provided to light having a Gaussian shaped intensity distribution, thereby it is possible to obtain a condensed light image having a flat intensity distribution (top-hat shape) at a light condensing position of the objective lens 42. Then, by performing processing by use of such a condensed light image, it is possible to uniformly process a range wider than the diffraction limit, and it is possible to improve a speed of the process.

In order to obtain such a top-hat shaped condensed light image, it is important that the objective lens 42 allows the whole input light from the center up to the tail of the Gaussian distribution to transmit through the objective lens. This is because, in the case where the tail of the Gaussian distribution is truncated in the objective lens 42, it is impossible to obtain a top-hat shaped intensity distribution in a condensed light image. Accordingly, in the case where processing is performed by switching among a plurality of objective lenses with different magnifications and numerical apertures, it is preferable to change a light diameter of light incident into the objective lens 42 by use of any one of the beam expanders 10A to 10C according to the first and second embodiments. Thereby, it is possible to allow the whole input light to transmit through the objective lens 42, which makes it possible to preferably obtain a top-hat shaped condensed light image.

In addition, a phase distribution for obtaining a top-hat shape may be superimposed on a lens pattern of one (or both) of the first lens unit 12 and the second lens unit 14. Further, the configuration of the present embodiment may be applied to a microscope for observation. That is, high-speed scanning or uniform illumination is possible by carrying out scanning or illumination onto an observation object by use of uniform light wider than the diffraction limit. Further, such a top-hat shaped condensed light image may be applied for the purpose of observing a reaction of an observation object by irradiating the object with light, for example, the purpose of a semiconductor failure analysis or light stimulation to cells.

A beam expander according to the present invention is not limited to the above-described embodiments and modifications, and other various modifications are possible. For example, in the above-described embodiments and modifications, the case in which the light to be incident into the first lens unit is parallel light is exemplified, meanwhile, the light to be incident into the first lens unit is not limited to parallel light, and various light beams may be applied.

Further, in the above-described third to fifth embodiments, the example in which the beam expander according to the present invention is applied to a microscope is shown, meanwhile, the beam expander according to the present invention may be used as an illumination optical system which is capable of changing a range to be illuminated. Further, as shown in FIG. 3, it is also possible to change an illuminating position by moving the central axis line of the output light from the central axis line of the input light.

Further, in the above-described third to fifth embodiments, the objective lens is disposed immediately after the second lens unit, meanwhile, the second lens unit and the exit pupil or the back focal position of the objective lens may be coupled via a telecentric lens such as a 4f system lens.

Further, in the above-described third to fifth embodiments, the objective lens is exemplified as an optical component provided at the subsequent stage of the second lens unit, meanwhile, not only an objective lens, but also various optical components may be provided at the subsequent stage of the second lens unit of the beam expander according to the present invention.

A beam expander according to the above-described embodiment includes a first lens unit which is composed of one of a spatial light modulator or a vari-focal lens, a second lens unit which is optically coupled to the first lens unit, and is composed of one of a spatial light modulator or a vari-focal lens, and a control unit that controls focal lengths of the first lens unit and the second lens unit by providing a lens pattern to the spatial light modulator, or by controlling a focal length of the vari-focal lens, and in the beam expander, a distance between the first lens unit and the second lens unit is invariable, and the control unit controls the focal lengths of the first lens unit and the second lens unit such that a light diameter of light input to the first lens unit and a light diameter of light output from the second lens unit are different from each other.

Further, the beam expander may be configured such that at least one of the first lens unit and the second lens unit includes a spatial light modulator, and the control unit provides the lens pattern with which a straight line including a central axis line of light input to the first lens unit and a straight line including a central axis line of light output from the second lens unit are separated from one another, to the spatial light modulator. For example, in the case where an optical component such as a TIRF microscope is disposed at the subsequent stage, it is preferable that the optical axis position of the parallel light output from the second lens unit be changed with respect to the optical axis position of the parallel light input to the first lens unit.

Further, the beam expander may be configured such that at least one of the first lens unit and the second lens unit includes a spatial light modulator. In accordance with this, it is possible to perform, in addition to changing of a light diameter, controls such as changing of an optical axis position and splitting of an optical axis, which have been unable to be performed by a conventional optical lens. Such controls are preferably realized by, for example, that the control unit superimposes a diffraction grating or a hologram pattern onto the lens pattern to be provided to the spatial light modulator.

Further, the beam expander may be configured such that the control unit superimposes a pattern for correcting aberrations generated in the beam expander, onto the lens pattern to be provided to the spatial light modulator. In this way, in accordance with the beam expander, it is also possible to easily configure the entire system without need for a complex lens shaping at the time of correcting aberrations.

Further, a beam expander according to the above-described embodiment includes a first lens unit including one of a spatial light modulator or a vari-focal lens, a second lens unit being optically coupled to the first lens unit, and including one of a spatial light modulator or a vari-focal lens, and a control unit controlling focal lengths of the first lens unit and the second lens unit, and in the beam expander, a distance between the first lens unit and the second lens unit is invariable, and the control unit controls the focal lengths of the first lens unit and the second lens unit such that a light diameter of light input to the first lens unit and a light diameter of light output from the second lens unit are different from each other.

Here, specifically, for example, in the case where the lens unit (the first lens unit or the second lens unit) is composed of a spatial light modulator, the control unit controls a focal length of the lens unit by providing a lens pattern to the spatial light modulator. Further, in the case where the lens unit is composed of a vari-focal lens, the control unit controls a focal length of the lens unit by controlling a focal length of the vari-focal lens.

Further, in the above-described configuration, the beam expander may be configured such that at least one of the first lens unit and the second lens unit includes a spatial light modulator, and the control unit provides a lens pattern to the spatial light modulator.

Further, the beam expander may be configured such that the first lens unit and the second lens unit respectively include reflection type spatial light modulators. Further, in this case, the beam expander may be configured such that the reflection type spatial light modulator composing the first lens unit and the reflection type spatial light modulator composing the second lens unit are disposed such that their light-reflecting surfaces are parallel to one another.

Further, in the beam expander, the first lens unit and the second lens unit may include a single reflection type spatial light modulator, and a partial region of its light-reflecting surface may be used as the first lens unit, and another partial region may be used as the second lens unit.

Further, the beam expander may be configured to include a plurality of reflective elements, and such that the second lens unit is optically coupled to the first lens unit via the plurality of reflective elements.

Further, the beam expander may be configured such that the spatial light modulator is a transmission type spatial light modulator.

Further, the beam expander may be configured such that the control unit provides the lens pattern with which a straight line including a central axis line of light input to the first lens unit and a straight line including a central axis line of light output from the second lens unit are separated from one another, to the spatial light modulator.

Further, the beam expander may be configured such that the control unit provides the lens pattern with which light output from the second lens unit is split into a plurality of optical paths, with respect to light input to the first lens unit, to the spatial light modulator.

Further, the beam expander may be configured such that the control unit superimposes a pattern for correcting aberrations generated in the beam expander, onto the lens pattern to be provided to the spatial light modulator.

Further, the beam expander may be configured such that a light diameter of input light incident into the first lens unit is ½ or less of a length of an effective surface of the first lens unit.

INDUSTRIAL APPLICABILITY

The present invention is applicable as a beam expander which is able to be easily configured, and is capable of shortening a required time at the time of changing a light diameter.

REFERENCE SIGNS LIST 10A to 10C—beam expander, 36a to 36e—reflecting mirror, 12—first lens unit, 14—second lens unit, 16—control unit, 22—first lens unit, 24—second lens unit, 26—control unit, 28—laser light source, 30—spatial light modulator, 30a—light-reflecting surface, 30b—first lens unit, 30c—second lens unit, 32—spatial filter, 32a—condensing lens, 32b—pinhole, 34—collimating lens, 40, 42, 44—objective lens, 46—diffractive optical element, 50A—microscope, 50B TIRF microscope, 50C—processing microscope, $P_1$—input light, $P_2$—output light.

The invention claimed is:
1. A beam expander comprising:
a first lens unit;
a second lens unit; and
a control unit configured to control a focal length $f_1$ of the first lens unit and a focal length $f_2$ of the second lens unit, wherein
the first lens unit and the second lens unit are composed of a single reflection type spatial light modulator having a single light-reflecting surface, a first region of the light-reflecting surface comprises the first lens unit, and a second region of the light-reflecting surface comprises the second lens unit,
the first lens unit is optically coupled to the second lens unit by light modulated by the first lens unit being input to the second lens unit,
a distance $L_1$ between the first lens unit and the second lens unit is invariable, and
the control unit controls the focal lengths of the first lens unit and the second lens unit by providing a lens pattern to the single reflection type spatial light modulator such that:
a light diameter of input light input to the first lens unit and a light diameter of output light output from the second lens unit are different from each other,
the light diameter of the output light is changed with respect to the light diameter of the input light, and
the focal lengths $f_1$ and $f_2$ and the distance $L_1$ satisfy the relationship $f_2 = L_1 - f_1$.

2. The beam expander according to claim 1, wherein the control unit provides the lens pattern with which a straight line including a central axis line of light input to the first lens unit and a straight line including a central axis line of light output from the second lens unit are separated from one another, to the single reflection type spatial light modulator.

3. The beam expander according to claim 1, wherein the control unit provides the lens pattern with which, with respect to light input to the first lens unit, light output from the second lens unit is split into a plurality of optical paths, to the single reflection type spatial light modulator.

4. The beam expander according to claim 1, wherein the control unit superimposes a pattern for correcting aberrations generated in the beam expander, onto the lens pattern to be provided to the single reflection type spatial light modulator.

5. The beam expander according to claim 1, wherein a light diameter of input light incident into the first lens unit is ½ or less of a length of an effective surface of the first lens unit.

6. The beam expander according to claim 1, comprising a plurality of reflective elements, wherein the second lens unit is optically coupled to the first lens unit via the plurality of reflective elements.

* * * * *